(12) United States Patent
Inskeep

(10) Patent No.: US 10,188,096 B1
(45) Date of Patent: Jan. 29, 2019

(54) DEVICE FOR GRIPPING AND REMOVING A BAIT STATION

(71) Applicant: Paul Edwin Inskeep, Dallas, GA (US)

(72) Inventor: Paul Edwin Inskeep, Dallas, GA (US)

(*) Notice: Subject to any disclaimer, the term of this patent is extended or adjusted under 35 U.S.C. 154(b) by 0 days.

(21) Appl. No.: 15/724,774

(22) Filed: Oct. 4, 2017

Related U.S. Application Data

(60) Provisional application No. 62/425,566, filed on Nov. 22, 2016, provisional application No. 62/550,933, filed on Aug. 28, 2017.

(51) Int. Cl.
*A01M 99/00* (2006.01)
*B66C 1/66* (2006.01)

(52) U.S. Cl.
CPC ............. *A01M 99/00* (2013.01); *B66C 1/66* (2013.01)

(58) Field of Classification Search
CPC ..... B66C 1/54; B66C 1/66; A45F 2005/1073; A45F 5/1026; A01M 99/00
See application file for complete search history.

(56) References Cited

U.S. PATENT DOCUMENTS

| 3,348,870 | A | * | 10/1967 | Zern | A47G 25/902 24/600.6 |
| 4,723,812 | A | * | 2/1988 | Masuda | B60J 7/11 292/263 |
| 6,241,294 | B1 | * | 6/2001 | Young | E05B 77/04 292/251.5 |
| 7,730,835 | B2 | * | 6/2010 | Iwamoto | B41F 27/1206 101/378 |
| 2015/0323123 | A1 | * | 11/2015 | Gunn | A01M 31/06 43/2 |

* cited by examiner

*Primary Examiner* — Stephen Vu
(74) *Attorney, Agent, or Firm* — Smith Gambrell & Russell LLP

(57) ABSTRACT

A spring loaded gripping device, having at least two hooks—one fixed and one moveable—extracts bait stations by engaging two portals on an internal cylindrical surface. The device is introduced into the station by adjusting the spring to a first retracted position, which causes the distance between the hooks do be less than the dimension defined by the distance between the portals of the bait station, thereby allowing entry of the hooks into the bait station. The spring is adjusted to a second extended position where the distance between the rods (hooks) is equal to or greater than the defined dimension. A tension is created between the portals which secures the station and allows its removal by a vertical lifting force applied to the device to which the hooks are secured.

4 Claims, 3 Drawing Sheets

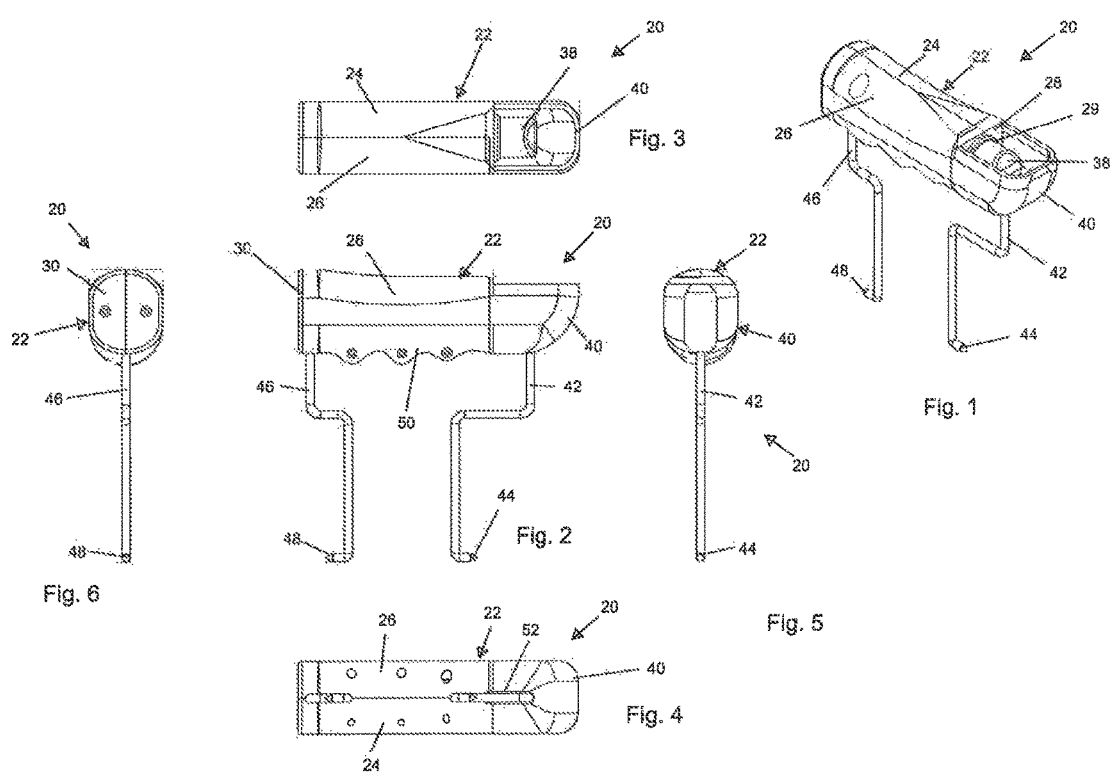

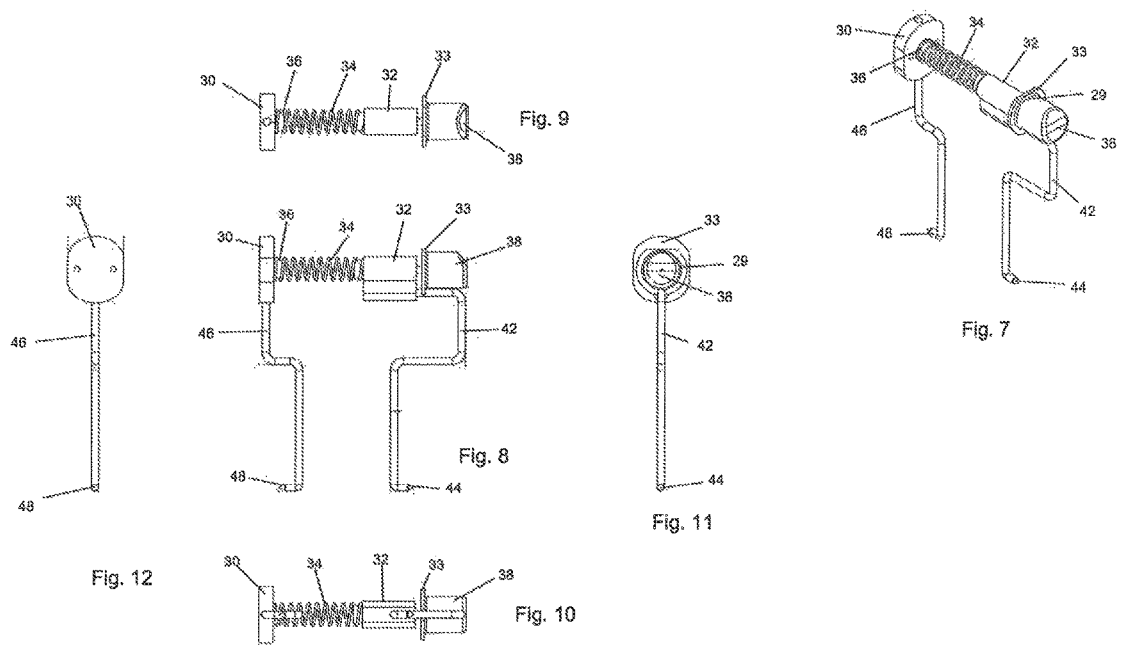

DEVICE FOR GRIPPING AND REMOVING A BAIT STATION

CROSS REFERENCE TO RELATED PATENT APPLICATIONS

This patent application claims priority from U.S. Provisional Patent Application No. 62/425,566, filed Nov. 22, 2016, and U.S. Provisional Patent Application No. 62/550,933, filed Aug. 28, 2017, which are hereby incorporated by reference.

FIELD OF INVENTION

This invention relates to a gripping device for removing a bait station from soil by gripping internal portals, opposite to one another, located on an internal cylindrical surface of the bait station.

BACKGROUND OF THE INVENTION

Termite infestations have been treated using bait stations and chemical barriers, individually or together. The use of bait stations has been considered to be more environmentally friendly because small amounts of pesticides are used. The pesticide is transported from the bait station to the termite colony by worker termites, which enhances the selectivity and effectiveness of the bait station approach. The location of bait stations may need to be changed due to treatment strategies or the lifetime of the equipment. Leaving bait stations in the soil too long after treatment has ended can cause damage to the environment.

There are a number of commercially available termite baiting systems including: Exterra Termite Inspection and Baiting System manufactured by Ensystex (www.ensystex.com), FirstLine Systemic Termite Control manufactured by FMC (www.perssolutions.fmc.com), the Sentricon System manufactured by Dow AgroSciences (www.semtricon.com) and the Spectracide Terminate Termite Home defense System manufactured Spectrum Corporation (United Industries Corporation) (www.dfwpest.com/terminate.htm).

Typically, the bait stations are placed at intervals along a boundary relative to a structure to be protected. The bait stations are typically first laid on the top of the ground in the general location of where they are to be installed and then dug in. Once installed, the stations generally blend in with general landscaping. The bait stations are periodically monitored to check on progress of the treatment. See, for example, Technical Manual 2013 Advanced termite Control Sentricon® and U.S. Pat. No. 6,922,940 B2.

At present, removal of a bait station is undertaken by the reverse application of the installation process. Trenching tools used to remove a bait station can damage the bait station and complicate removal. Properly removed bait stations can be reused. Damaged or abandoned bait stations impact the environment and can be a source of potential harm to children and unknowing adults.

SUMMARY OF THE INVENTION

A gripping device for gripping and removing a bait station from soil includes a frame that supports opposing hooks that engage portals on an internal cylindrical surface of the bait station. Typically, the two portals are positioned opposite to each other around the internal cylindrical surface of the bait station. Consequently, the gripping device employs two hooks with hook ends to engage in the portals of the bait station. One of the hooks is fixedly attached to the frame, and the other hook is moveable in an elongated slot in the frame so that the distance between the hooks can be controlled. In a first retracted position, when the two hooks are close together, the distance between the hooks allows the hooks to enter into the internal cylindrical structure of a bait station. Once the hooks have entered the internal cylindrical structure of the bait station, the hooks are moved to a second extended position in order to engage the portals on the internal surface of the bait station. Once the hooks have engaged the portals, the bait station can be removed by an upward force applied to the frame.

The frame can have more than one position for the fixed hook to provide a range of distances between the fixed hook and the moveable hook. The range of distances permits entry into the cylindrical structure and the gripping of the portals of bait stations of various sizes.

The shape of the hook ends can vary so long as the shape affords access to the portals and assures engagement so that the bait station can be removed using an upward force applied to the frame.

The spring assembly includes a plunger and a compression coiled spring. The plunger is connected to the moveable hook and transfers the compression and relaxation motion of the spring into the back and forth motion of the moveable hook in the elongated slot, in a controlled fashion. The compression spring is attached between a back end piece of the frame and the plunger.

The method of removing the bait station typically begins with taking the locking cap off of a bait station embedded in soil and removing the bait. The device is positioned over the opening of the bait station. Adjustments of the distance between the fixed hook and the adjustable hook can be readily done by sight. The adjustments are accomplished by simple release and compression of the spring by a thumb piece comprising a forward portion of the plunger. Movement of the plunger varies the distance between the fixed and movable hooks. The compression of the spring narrows the distance so that the hook ends can enter the opening to the internal cylindrical structure and then relaxed so that distance increases, causing the hook ends to engage the portals of the bait station. The hooks can be flexible to allow for some play and facilitate operation. The design of the gripping device also allows the hooks to remove bait from the trap.

The foregoing and other features and advantages of the invention will be apparent to those of ordinary skill in the art from the following more particular description of the invention and the accompanying drawings.

BRIEF DESCRIPTION OF THE FIGURES

FIG. 1 is a perspective view of a gripping device in accordance with the present invention.

FIG. 2 is a side elevation view of the gripping device in accordance with the present invention.

FIG. 3 is a top plan view of the gripping device in accordance with the present invention.

FIG. 4 is a bottom plan view of the gripping device in accordance with the present invention.

FIG. 5 is a front elevation view of the gripping device in accordance with the present invention.

FIG. 6 is a back elevation view of the gripping device in accordance with the present invention.

FIG. 7 is a perspective view of the gripping device with the sides removed in accordance with the present invention.

FIG. 8 is a side elevation view of the gripping device with the sides removed to reveal internal detail all in accordance with the present invention.

FIG. 9 is a top plan view of the gripping device with the sides removed to reveal internal detail all in accordance with the present invention.

FIG. 10 is a bottom plan view of the gripping device with the sides removed to reveal internal detail all in accordance with the present invention.

FIG. 11 is a front elevation view of the gripping device with the sides removed to reveal internal detail all in accordance with the present invention.

FIG. 12 is a back elevation view of the gripping device with the sides removed to reveal internal detail all in accordance with the present invention.

DETAILED DESCRIPTION OF THE INVENTION

Figure 13:
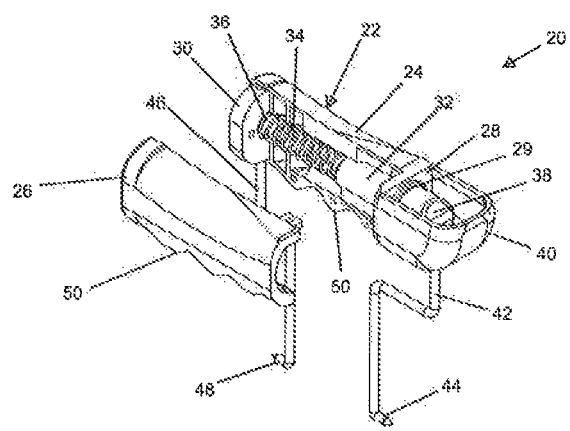
FIG. 13 is an exploded perspective view of the gripping device in accordance with the present invention.

The invention will be described more fully hereinafter with reference to the accompanying drawings, in which an embodiment of the invention is shown. This invention may, however, be embodied in many different forms and should not be construed as limited to the embodiment set forth herein; rather, the embodiment is provided so that this disclosure will be thorough and complete, and will fully convey the scope of the invention to those skilled in the art.

In the following description, numerous specific details are set forth. However, it is to be understood that embodiments of the invention may be practiced without these specific details. In other instances, well-known methods, structures, and techniques have not been shown in detail in order not to obscure an understanding of this description.

An embodiment of the present invention is shown in FIGS. 1-13. A bait station gripping mechanism 20 includes a frame 22 comprising a first side piece 24, a second side piece 26, a front end piece 28, and a back end piece 30. The first side piece 24, the second side piece 26, the front end peace 28, and the back end piece 30 are attached to each other by fasteners, adhesives, welding, or other suitable means.

The front end piece 28 has an opening 29, and the back end piece 30 has a protruding spring mounting peg 36. The peg 36 protrudes to the right as shown in FIGS. 8 and 9. A plunger 32, with a thumb piece 38 at its front end, is slidably mounted in the front piece opening 29 with the thumb piece 38 protruding from the front piece opening 29 to the right of the front end piece 28 as shown in FIG. 13. A compression spring 34 is attached to the back end of the plunger 32 and engages the spring mounting peg 36 of the back end piece 30. The compression spring 34 urges the plunger 32 toward the right as shown in FIG. 13. The rightward movement of the plunger 32 is restrained by a fixed plunger collar 33 engaging the back side of the front end piece 28. A lock and release mechanism may be attached to the plunger collar 33 in order to retain the plunger 32 in its retracted leftward position with the spring 34 compressed in order to relieve the user of fatigue required to hold the spring 34 in a compressed condition during maneuvering of the gripping device 20.

A thumb protective cover 40 is mounted to the front end piece 28 and partially surrounds the thumb piece 38 so that the thumb piece 38 is accessible from the top of the gripping mechanism 20, but the thumb piece 38 (and the user's thumb) is protected from the bottom and sides of the gripping mechanism 20. A handgrip 50 is formed along the bottom of the frame 22 in order to accommodate the user's fingers.

A front hook 42 with a hook end 44 is attached to the plunger 32 to the left of the front end piece 28 as shown in FIG. 13. The front hook 42 extends through an elongated slot 52 created between the first side piece 24 and the second side piece 26 as best seen in FIG. 4. The slot 52 allows the front hook 42 to move back and forth with respect to the frame 22.

A back hook 46 with a hook end 48 is fixedly attached to the back end piece 30. In order to increase the utility of the gripping device 20, the frame 22 may have additional connection points for the back hook 46 along the length of the handgrip 50. Such additional connection points allow the gripping device 20 to increase the range of possible distances between the hooks 42 and 46 and thereby accommodate the removal of other bait station types. The hook ends 44 and 48 are configured to engage portals, including slots or openings, on the inside of a bait station.

The actual dimensions of the device can vary. The frame 22 is typically 5½"×1½"×⅛". The elongated slot 52 is 2⅛" long and ¼" wide. The compression spring 34 is 2¼" in length. The hooks 42 and 46 have a ¼" diameter and a length of 4". The hook ends 16 and 18 are ⅝" in length.

In operation, the user grips the frame 22 with the user's fingers engaging the handgrip 50 at the bottom of the frame 22. The user's thumb is then inserted into the thumb cover 40 and contacts the thumb piece 38. In order to insert the front hook 42 and the back hook 46 into a bait station, the user exerts pressure on the thumb piece 38 (leftward as shown in FIG. 13) to compress the spring 34 and move the plunger 32 to a first retracted position. As the compression spring 34 is compressed by the user, the front hook 42 connected to the plunger 32 moves leftward as shown in FIG. 13 so that the distance between the front hook 42 and the back hook 46 is narrowed. Once the distance between the front hook 42 and the back hook 46 has been sufficiently narrowed, the front hook 42 and the back hook 46 are inserted into the bait station. Once inside the bait station, the user releases pressure on the thumb piece 38 so that the front hook 42 and the back hook 46 can extend apart with the plunger 32 moving to a second extended position. With the plunger 32 in the second extended position, the hook ends 44 and 48 engage portals on the inside of the bait station. Once the hook ends 44 and 48 have engage the portals on the inside of the bait station, the user exerts an upward force on the handgrip 52 thereby remove the bait station.

Having thus described illustrative embodiments of the present invention, those skilled in the art will appreciate that the disclosures are illustrative only and that various other alternatives, adaptations, and modifications may be made within the scope of the present invention. Accordingly, the present invention is not limited to the specific embodiments as illustrated herein, but is only limited by the following claims.

What is claimed is:

1. A gripping device for removing a bait station from a ground soil, the bait station having an opening with a dimension, the opening leading to an internal surface with at least two opposing portals on the internal surface, the gripping device comprising:
   a) a frame comprising a back end piece and a front end piece spaced from each other by connecting sides, wherein the connecting sides define a bottom portion with a handgrip to conform to fingers of a user;

b) a plunger slidably mounted in an opening in the front end piece;

c) a spring connected between the back end piece and plunger for biasing the plunger toward a second extended gripping position from a first retracted position;

d) a first hook fixedly attached to the frame; and e) a second hook attached to the plunger for movement between the first retracted position and the second extended gripping position, wherein the first hook and the second hook fit within the dimension of the opening of the bait station when the plunger is in the first retracted position and wherein the first hook and the second hook engage the two opposing portals when the plunger is in the second extended gripping position; and wherein the plunger has a thumb piece opposite the engagement of the spring with the plunger and wherein the front end piece includes a thumb cover that has a bottom, two sides, and an open top to allow a user's thumb to engage the thumb piece.

2. The gripping device of claim 1, wherein each of the hooks has a hook end configured to engage the opposing portals when the plunger is in the second extended gripping position.

3. The gripping device of claim 1, wherein the frame has a plurality of positions to which the first hook can be fixedly attached.

4. The gripping device of claim 1, wherein the hooks are flexible.

\* \* \* \* \*